US006766330B1

(12) United States Patent
Chen et al.

(10) Patent No.: US 6,766,330 B1
(45) Date of Patent: Jul. 20, 2004

(54) UNIVERSAL OUTPUT CONSTRUCTOR FOR XML QUERIES UNIVERSAL OUTPUT CONSTRUCTOR FOR XML QUERIES

(75) Inventors: Shyh-Kwei Chen, Chappaqua, NY (US); Ming-Ling Lo, Katonah, NY (US)

(73) Assignee: International Business Machines Corporation, Armonk, NY (US)

( * ) Notice: Subject to any disclaimer, the term of this patent is extended or adjusted under 35 U.S.C. 154(b) by 710 days.

(21) Appl. No.: 09/689,377

(22) Filed: Oct. 12, 2000

Related U.S. Application Data (63) Continuation-in-part of application No. 09/466,627, filed on Dec. 17, 1999.
(60) Provisional application No. 60/160,334, filed on Oct. 19, 1999.

(51) Int. Cl.[7] ............................................. G06F 17/30
(52) U.S. Cl. ............................ 707/102; 707/5; 707/10
(58) Field of Search ............................ 707/1–10, 102, 707/203

(56) References Cited

U.S. PATENT DOCUMENTS

| | | | | |
|---|---|---|---|---|
| 5,970,490 | A | * 10/1999 | Morgenstern | ................. 707/10 |
| 6,480,860 | B1 | * 11/2002 | Monday | ...................... 707/102 |
| 6,523,062 | B1 | * 2/2003 | Bridgman et al. | .......... 709/203 |
| 6,584,459 | B1 | * 6/2003 | Chang et al. | ................... 707/3 |

OTHER PUBLICATIONS

Goldfarb et al., "XML Handbook", 1998, Prentice Hall, Inc., pp 565–567.*
Ludascher et al., "View Definition and DTD Interface for XML", 1999, Workshop–SS2, ATT, 1999, pp 1–11.*
Shanmugasundaram et al., "Relational Databases for Querying XML Documents: Limitations and Opportunities", 19999, Procedings of Very Large Data Base Endoment, pp1–13.*

D. Kuto et al., "Morphing Towards Interoperable Catalogues," Advances in Digital Libraires 2000, Proceedings, IEEE, pp. 105–115, May 2000.
M. Imamura et al., "Metadata Representation in XML for Internet–Based Electronic XML Application from Business to Government," Parallel and Distributed Systems: Workshops, Seventh International Conference on 2000 IWATE, pp. 387–392, Jul. 2000.
M. Fernandez et al., "SilkRoute: Trading Between Relations and XML," Computer Networks, Elsevier Science Publishers B.V., vol. 33, No. 1–6, pp. 723–745, Jun. 2000.
Selena Sol, "Introducing the Valid XML Document and the DTD," Web Developer's Virtual Library, pp. 1–4, May 1999.
Ken Sall, "Generating a DTD the Easy Way," Web Developer's Virtual Library, pp. 1–3, Apr. 1999.
W3C Recommendation, "Extensible Markup Language (XML) 1.0 (Second Edition)," pp. 1–59, Oct. 2000.
T. Milo et al., "Typechecking for XML Transformers," Proceedings ACM Sigact Sigmod Sigart, pp. 11–22, May 2000.
Extensible Markup Language (XML) 1.0, W3C Recommendation, pp. 1–32, http://www.w3.org/TR/1998/REC–xml–19980210, Feb. 10, 1998.
"Document Object Model (DOM) Level 1 Specification, Version 1.0," W3C Recommendation, pp. 1–169, http://www.w3.org/TR/REC–DOM–Level–1/, Oct. 1, 1998.

* cited by examiner

*Primary Examiner*—Greta Robinson
*Assistant Examiner*—S R Pannala
(74) *Attorney, Agent, or Firm*—Thu Ann Dang; Ryan, Mason & Lewis, LLP (57) ABSTRACT

Methods and apparatus are provided according to the present invention which guarantee that an Extensible Markup Language (XML) query output conforms to a Document Type Definition (DTD) of the user's choice. The present invention allows for: (i) selection of a DTD; (2) integration of one or more XML queries with the DTD; and (iii) in accordance with the provided algorithm, automatic generation of a valid output XML document conforming to the DTD, using the data selected by the XML queries as content of the XML document.

33 Claims, 7 Drawing Sheets

FIG. 4 x: BINDING VARIABLE
a,b: FILTER VARIABLE IN XML QUERY
REFERENCE a AND b IN DTDSA AS x.a AND x.b

```
                <!DOCTYPE PO [
1301 —      <!ELEMENT PO (id, buyer, seller, (lineitem)*)>
1302 —      <!ELEMENT id (#PCDATA)>
1303 —      <!ELEMENT buyer (address)>
1323 —      <!ATTLIST buyer
                        name CDATA #REQUIRED>
1304 —      <!ELEMENT seller (address)>
1324 —      <!ATTLIST seller
                        name CDATA #REQUIRED>
1311 —      <!ELEMENT address (#PCDATA)>
1307 —      <!ELEMENT lineitem (prodname, amount)>
1308 —      <!ELEMENT prodname (#PCDATA)>
1310 —      <!ELEMENT amount (#PCDATA)>
            ]>
```

FIG. 6C

```
<!DOCTYPE PO [                          1505
<!ELEMENT PO (id, buyer, seller,
     1500        (lineitem)*::w:= row(lineitem, poid, PO.poid(r)) )>
                     ::r:=row(PO, poid, x)———1510
<!ELEMENT id (#PCDATA:PO.poid(r) )>———1515
<!ELEMENT buyer (address)> ::s:= row(company, id PO.buyer(r))———1535
<!ATTLIST buyer                 1520
        name CDATA #REQUIRED :company.name(s)>
<!ELEMENT seller (address)> ::s:= row(company, id, PO.seller(r))———1540
<!ATTLIST seller
        name CDATA #REQUIRED :company.name(s)>
<!ELEMENT address (#PCDATA :company.addr(s) )>
                                        ———1545         1525
<!ELEMENT lineitem (prodname,
              amount)> ::v:= row(prod, prodid, lineitem.prodid(w))
<!ELEMENT prodname (#PCDATA :product.prodname(v) )>
<!ELEMENT amount (#PCDATA :lineitem.amount(w) )>
]>
```

```
<PO>
    <id> 100 </id>                    2005
    <buyer name="CITIBANK">
        <address> NY </address>
    </buyer>                          2010
    <seller name ="IBM">
        <address> NY </address>
    </seller>
    <lineitem>
2010    <prodname> THINKPAD </prodname>
        <amount> 20K </amount>
2015 </lineitem>
    <lineitem>
        <prodname> SERVER </prodname>
        <amount> 100K </amount>
    </lineitem>
</PO>
```

UNIVERSAL OUTPUT CONSTRUCTOR FOR XML QUERIES UNIVERSAL OUTPUT CONSTRUCTOR FOR XML QUERIES

CROSS REFERENCE TO RELATED APPLICATIONS

This application is a continuation-in-part of the copending U.S. patent application identified as Ser. No. 09/466,627, filed on Dec. 17, 1999 in the name of the present inventors and entitled "Method and Apparatus for Converting Between Data Sets and XML Documents," which claims the benefit of provisional application No. 60/160,334 filed Oct. 19, 1999.

FIELD OF THE INVENTION

The present invention is related to the field of information retrieval and data integration and, more particularly, to methods and apparatus for query and access of data from various data sources as integrated XML documents, for guaranteeing that the query outputs conform to the DTD of users' choice, and for generating XML documents based on the combination of different XML queries.

BACKGROUND OF THE INVENTION

The eXtensible Markup Language (XML) is emerging as one of the most important formats for document and data representation and transmission. For example, business documents can be presented by XML for Internet transmission and World Wide Web access. More and more users and new applications are starting to require their input and output to be in XML format.

Details of XML are described in "Extensible Markup Language (XML) 1.0," W3C Recommendation Feb. 10, 1998, the disclosure of which is incorporated by reference herein. However, the aspects of XML necessary for an understanding of the present invention are provided herein.

For XML documents, there is the concept of a Document Type Definition (DTD). Each DTD describes the structure of a (potentially infinitely large) set of XML documents. An XML document can have an associated DTD or no corresponding DTD at all. When an XML document is associated with a DTD, its structure must conform to the specification of the DTD. An XML document is "well-formed" if it is grammatically correct and the tags are properly nested. An XML document is "valid" if it conforms to a specific DTD.

XML query languages, e.g., XML-QL and XQL, enable users to ask questions of XML documents and usually return the answers also in the form of XML documents. XML addressing mechanisms, e.g., XPath, identify elements inside XML documents. For ease of discussion, we will refer to all of them as XML query languages.

Current XML query mechanisms generally contain the following logical steps:

1. Query scope identification: usually one or more XML documents or one or more XML elements within some document(s) are identified as being within the query scope.
2. Filtering: select data items to be used as result from the query scope.
3. Output construction: converting and constructing the selected data items into some desirable output format and structure.

An XML document can be modeled as a tree, see "Document Object Model (DOM) Level 1 Specification, version 1.0," W3C Recommendation Oct. 1, 1998, the disclosure of which is incorporated by reference herein. The filtering step of XML query languages usually either identifies lists of data or elements (scalar-based filtering), or lists of subtrees (subtree-based filtering). The query language may provide a construction mechanism and convert the lists into an XML document in the output construction step. For the case of subtrees, each subtree is rooted at some selected element in the query scope.

The construction step of current query mechanisms is highly unstructured and ad hoc. Some query languages, e.g., XML-QL, allow the above-described three steps to be nested or recursively mixed. Most construction steps are XML instance-based instead of DTD-based. That means the outputs of such queries are well-formed, but not necessarily valid (conforming to a DTD) XML documents.

In many situations, it is necessary to make the output XML document of an XML query conform to a certain DTD. In e-business applications, trading partners may have mutually agreed upon DTDs to which the exchanged XML documents must conform. If the query outputs are valid, they can be used by trading partners immediately. Such task, although possible through ad hoc manipulation of the query output, is inconvenient and hard to guarantee correctness. Furthermore, the XML query languages or expressions proposed so far do not mix among different query languages or expressions. Thus, there is a need for mechanisms and methods that guarantee that the query output conforms to the DTD of the user's choice.

SUMMARY OF THE INVENTION

The present invention provides methods and apparatus that guarantee that the query output conforms to the DTD of the user's choice. The present invention allows for: (i) selection of a DTD; (ii) integration of one or more XML queries with the DTD; and (iii) in accordance with the provided algorithm, automatic generation of a valid output XML document conforming to the DTD, using the data selected by the XML queries as content of the XML document.

In one aspect of the present invention, a method of processing one or more Extensible Markup Language (XML) queries comprises the steps of: (i) generating a mapping construct which maps a predetermined document type definition (DTD) to one or more data sources to be accessed in response to the one or more XML queries, the mapping construct including a binding specification wherein the one or more XML queries are bound to one or more binding variables; (ii) evaluating the one or more XML queries in accordance with the binding specification of the mapping construct and assigning the evaluation result to the one or more binding variables; and (iii) generating an XML document resulting from the query evaluation, wherein the resulting XML document conforms to the predetermined DTD. It is to be appreciated that the one or more XML queries may be written in one or more XML query languages. Also, the resulting XML document may be a combination of more than one XML query associated with one or more query languages. The resulting XML document may also be a combination of one or more XML queries and one or more non-XML queries. Further, the DTD is preferably specified by a user.

The mapping construct generation step may comprise the steps of: (i) determining suitable DTD constructs; (ii) binding the constructs to variables; (iii) associating the variables with a partial XML result obtained from scoping and filtering stages of the XML query; and (iv) distributing the variables to suitable DTD constructs with value functions. Further, the method may comprise the step of accepting scalar-based results from the scoping and filtering stages. Also, subtree-based results may be accepted from the scoping and filtering stages. The method may also comprise the step of allowing the bindings to be used as parameters in at least one of value generation functions and other binding functions. Further, the method may comprise the step of resolving a nested or recursive filtering query construct with sequential cascade binding constructs.

The query evaluation step may comprise the step of combining different parsing and evaluating mechanisms for evaluating XML queries from different XML query languages. The method may also comprise the step of allowing binding variables to be used in one or more XML queries of different query languages. Further, one or more XML queries of different query languages may be evaluated with binding variables as parameters.

The resulting XML document generation step may comprise the steps of: (i) recursively traversing DTD constructs from a root element; and (ii) associating with binding variables after one of resolving binding functions and evaluating XML queries, until reaching a leaf construct, where a partial XML result is obtained by evaluating associated value functions. The resulting XML document may be composed during a traversal returning stage by adding XML tags enclosing the partial XML result.

As will be explained below, the methodology of the invention preferably makes use of the DTD Source Annotation (DTDSA) method described in U.S. Ser. No. 09/466,627 filed on Dec. 17, 1999 and entitled "Method and Apparatus for Converting Between Data Sets and XML Documents," the disclosure of which is incorporated by reference herein. However, it is to be understood that the invention is not limited to the DTDSA mechanism. That is, other mechanisms or methods can be used. By way of example only, the IBM DB2 extender (IBM Corporation of Armonk, N.Y.), which saves the mapping information connecting DTD and a DB2 database in a separate file, may be employed.

Many advantages may be realized in accordance with such an inventive universal output constructor for XML queries. The following are some examples of these advantages. The present invention allows the user to choose an arbitrary DTD and to present the query output using that DTD. The present invention works with XPath or any other XML query language that the user chooses as the query pattern matching mechanism. The present invention allows multiple queries of different or same query languages or expressions to be naturally integrated and produce a single output XML document. The present invention allows the aforementioned queries to be correlated. The present invention allows XML queries to be integrated with other data query or access mechanisms (e.g., Structured Query Language or SQL) to produce a single XML output document. The present invention allows the aforementioned XML queries and other data queries or access commands to be correlated.

These and other objects, features and advantages of the present invention will become apparent from the following detailed description of illustrative embodiments thereof, which is to be read in connection with the accompanying drawings.

DETAILED DESCRIPTION OF PREFERRED EMBODIMENTS

Many concepts and constructs are used in the XML specification. However, some of them are implicitly references but not clearly defined, some others are used without being given a name. To facilitate our discussion, we clearly define or give names to these concepts and constructs here, particularly, in the table below. In the column "Name given in," if the value is "previous work," that means the concept is used in previous work, for example, in accordance with the DTDSA mechanism described in the above-referenced U.S. Ser. No. 09/466,627, but not defined in the DTD specification. If the value is "XML Spec," that means the concept is referenced, sometimes appears in a production rule, but is not explicitly defined in the DTD specification.. Some of the terms are defined in a recursive manner, and each term may have an abbreviation enclosed by parentheses.

| Term | Definition | Name given in |
|---|---|---|
| repetition symbol | '?', '*', or '+' | previous work |
| element name (ENAME) | Name used in a element type declaration | XML Spec |
| choice list (CLIST) | a list of cp enclosed by '(' and ')', and separated by '\|', i.e. "(cp \| cp \| . . . \| cp)". | XML Spec |
| terminal choice list (TLIST) | a list of "#PCDATA" and ENAMEs, each appearing only once, enclosed by '(' and ')', and separated by '\|', i.e. "(#PCDATA \| ENAME \| ENAME . . . \| ENAME)" | previous work |
| sequence (SEQ) | a list of cp enclosed by '(' and ')' and separated ', ', i.e, "(cp, cp , . . . , cp)" | XML Spec |
| content unit (CU) | ENAME, CLIST, SEQ, or TCLIST | previous work |
| content particle (CP) | a content-unit followed optionally by a repetition symbol, i.e. (Name \| choice \| seq) ('?' \| '*' \| '+')? | XML Spec |
| content spec | the part that matches 'contentspec' in the DTD production rules. That is, the part that follows ENAME and | XML Spec |

-continued

| Term | Definition | Name given in |
|---|---|---|
| | proceeds '>' in a DTD element type declaration. | |
| children content spec (children) | a content spec that is a choice or sequence content unit followed optionally by a repetition symbol | XML Spec |
| mixed content spec (mixed) | a content spec that is a "(#PCDATA)" subexpression, or a terminal choice list followed by a '*' repetition symbol | XML Spec |
| PCDATA declaration | #PCDATA | XML Spec |
| attribute definition (ATD) | The part that includes an ENAME, a type, e.g., CDATA, ID, IDREF etc., and a default declaration. | XML Spec |
| value declaration | PCDATA declaration or attribute definition. | previous work |
| Element type declaration (ED) | The part that includes a "<!ELEMENT", followed by an ENAME, content-spec, and a ">" | previous work |
| Attribute list declaration (AD) | The part that includes a "<!ATTLIST", followed by an ENAME, a list of ATDs, and a ">" | previous work |
| DTD declaration | element type declaration and attribute list declaration | previous work |
| DTD construct | a DTD declaration, a (sub-expression of a) content spec, or a (sub-expression of an) attribute-list declaration | previous work |

In addition, column variable is a variable whose value is a column identity. Row variable is a variable whose value is a row of a table. A row variable is defined on a particular table, and can only have a row of that table as its value. Vector variable is a variable whose value is a list of objects, including values (or scalars), variables, and other vectors, enclosed by "<" and ">", e.g., v=<100, <1, "ab", 10>, x>.

A detailed description of the invention will now follow. Such descriptions will illustrate the various methods and apparatus of the invention for query and access of data from various data sources as integrated XML documents, for guaranteeing that the query outputs conform to the DTD of users' choice, and for generating XML documents based on the combination of different XML queries.

In this invention, as mentioned above, a preferred implementation for the mapping between DTD and relational schema is a DTD source annotation (DTDSA), as described in the above-referenced U.S. Ser. No. 09/466,627. In other words, the mapping between DTD and relational schema is encoded inside the DTD as annotations. The binding and value specifications are defined immediately following the DTD constructs which they are associated with. The method to establish mapping between DTD and underlying data is by associating a value specification with each #PCDATA, attribute definition, and choice list, associating a binding specification with each DTD construct ended with a trailing repetition symbol, and optionally associating binding specifications with other DTD constructs. A value specification is a parameterized formula containing variables, which, when a data object is substituted for each variable in it, produces a text value. A binding specification is a variable and expression pair. The expression can be a list of data objects, a formula that identifies a list of data objects, or a parameterized formula containing variables, which, when a data object is substituted for each variable in it, produces a list of data objects. A more detailed description of the DTDSA mechanism that may be used in a preferred embodiment of the present invention is provided below in a section entitled "DTDSA Mapping" following the detailed description of the present invention.

(a) List Producing Function L( )

First, we propose a function L(XQ), which takes the output of an XML query, XQ, and returns the result of the filtering step of the XQ in a list. Assume that XQ has n filtering variables $a_i$ for i=1, . . . ,n, and returns k lists $\{a_{11}, a_{12}, \ldots, a_{1n}\}, \{a_{21}, a_{22}, \ldots, a_{2n}\}, \ldots, \{a_{k1}, a_{k2}, \ldots a_{kn}\}$. L(XQ) returns a list of vectors:

$$\{(a_{11}, a_{12}, \ldots, a_{1n}), (a_{21}, a_{22}, \ldots a_{2n}), \ldots (a_{k1}, a_{k2}, \ldots a_{kn})\}$$

If XQ uses scalar-based filtering, each $a_{ij}$ is a scalar. If XQ uses subtree-based filtering, each $a_{ij}$ is a subtree.

(b) Binding Specifications

The usage and semantics for binding specification is the same for XML query languages using either scalar or subtree-based filtering.

Given a DTD and set of XML queries, we can form a DTDSA that constructs a valid XML document using the data selected, i.e., at the filtering step, of the queries as follows. The filtering step of an XML query can be associated to a binding variable to form a binding specification as follows:

$$::b:=L(XQ)$$

where XQ is the XML query, b is the binding variable, and $a_i$ for i=1, . . . ,n are filtering variables in XQ.

The semantics are as follows:

This list of values (vectors) returned by L(XQ) is associated with b using the DTDSA binding specification semantics described herein, i.e., the values are bound to b in turn, one for each instantiation of the annotated DTD construct.

The values bound to b can be used in other binding specifications or value specifications. We use the following notation for the references to b:

b refers to the whole vector $(a_{i1}, a_{i2}, \ldots a_{in})$, and $b.a_j$ refers to the jth field of the current vector bound to b. If the current vector is the ith in the list returned by L(XQ), then $b.a_j=a_{ij}$.

(c) XML Queries Using Scalar-based Filtering

The usage and semantics of value specifications for XML queries using scalar-based filtering is the same as in the original DTDSA definition described herein.

For binding specifications, the usage can include single XML query, multiple XML queries (correlated or uncorrelated), and non-XML queries.

1. One XML query construction:

XQ is used as the binding function of a binding specification associated with the root element, each DTD construct such as #PCDATA, choice list, CDATA or enumerate type is annotated by a value specification which is either a $b.a_i$, or a function on $b.a_i$.

2. Multiple non-correlated XML query construction:

Each XML query is used as the binding function of a binding specification, the binding specification of the functions.

3. Multiple correlated XML query construction:

Each XML query is used as the binding function of a binding specification, the binding specification of the functions. The input parameter of an XML query may be of the form $b.a_i$ where b is the binding variable of another binding specification.

4. Construction for multiple correlated and uncorrelated XML and non-XML queries:

Same as pure XML query cases, but some query can be non-XML queries.

(d) XML Queries Using Subtree-based Filtering

The syntax and semantics of the binding specification remains the same.

::b:=L(XQ(C, xs))

where b is the binding variable, XQ is an XML query function, C is an XML query scope, and xs is the query (filtering) string.

Note L(XQ) in this case returns $\{(a_{11}, a_{12}, \ldots, a_{1n}), (a_{21}, a_{22}, \ldots a_{2n}), \ldots (a_{k1}, a_{k2}, \ldots a_{kn})\}$, where each $a_{ij}$ is a subtree, and b is bound to a list of vectors of subtrees in turn.

Let f( ) be a function that takes references to one or more binding variables as input, and returns a subtree. Let $y=f(b_1, b_2, \ldots b_m)$, where $b_i$, for $i=1, \ldots m$, are references to binding variables. For example, y may be $b.a_j$.

(e) Using Binding Variables in Value Specifications

Two types of functions may appear in value specifications:

i. g(y) and h(b), where g( ) and h( ) each returns a scalar value.

ii. XQ(y, xs) and XQ(b, xs) where XQ( ) is an XML query and xs is some query string.

A value specification of the form ":g(y)" or ":h(b)" must annotate a #pcdata, choice list, cdata, or enumerate type, and provide value for the annotated construct.

A value specification of the form ":XQ(y, xs)" or ":XQ(b, xs)" must annotate an element E. The subtree ST, returned by XQ, will be used as an instance of E in the final XML document constructed by the methodology of the present invention.

The present invention provides two types of policies for using ST as an instance of element E:

1. Test policy: If ST conforms to the portion of DTD described by E and its descendants, ST is accepted as an instance of E. Otherwise, it is rejected, and either some default value is used for the instance, or the query output construction process is aborted.

2. Transform policy: If ST conforms to the portion of DTD described by E and its descendants, ST is accepted as an instance of E. Otherwise, some transformation algorithm is used to transform ST into ST' which conforms to E.

(f) Using Binding Variables in Other Binding Specifications

Binding variables bound to XML query outputs may be used in other binding specifications as follows:

::x:=L(XQ(b, xs)), or

::x:=L(XQ(f(b), xs)), or $::x:=L(XQ(\{f_1(b_i), f_2(b_2), \ldots f_m(b_m)\}, xs))$ where xs is a query (filtering) string, b, and $b_i$ for $i=1, \ldots, m$ are binding variables f, and $f_i$ for $i=1, \ldots, m$, are functions that can take a list of subtrees and return a subtree.

(g) Using Cascade Binding for Nested Filtering/construction

Most XML query languages allow construction and filtering stages to be recursively defined. Let $F_1C_1F_2C_2 \ldots F_nC_n$ represent a recursively defined query, where $F_i$ is the ith filtering stage and $C_i$ is the ith construction stage, for $i=1, 2, \ldots, n$. Assume that $F_1$ defines $a_{11}, a_{12}, \ldots, F_2$ defines $a_{21}, a_{22}, \ldots$, and $F_n$ defines $a_{n1}, a_{n2}, \ldots$, and $a_{ij}$ may be used or referred in $F_k$, for $k>i$, and in $C_k$, for $k \geq i$.

We can have the following cascade binding:

$::x_n:=BF_n \ldots ::x_2:=BF_2::x_1:=BF_1$ where $BF_i$ is binding functions, for $i=1, 2, \ldots, n$, and
   $BF_1$ returns (defines) $<a_{11}, a_{12}, \ldots>$,
   $BF_2$ returns $<a_{21}, a_{22}, \ldots>$,
   $BF_n$ returns $<a_{n1}, a_{n2}, \ldots>$.

Also $x_i.a_{ij}$ may be a parameter of $BF_k$, for $k>i$.

Figure 1:
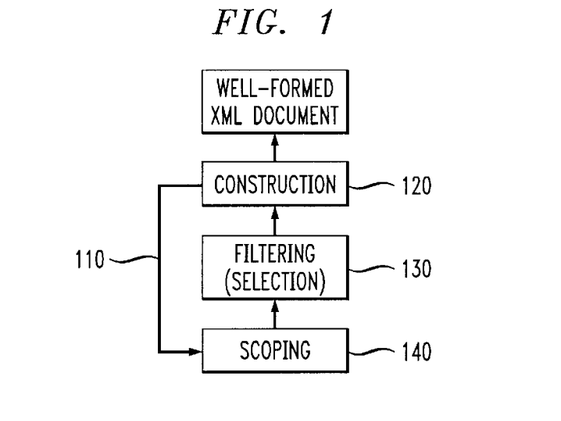
FIG. 1 is a block diagram illustrating the current XML query languages.

Referring now to the drawings in which like numerals represent the same or similar elements and initially to FIG. 1, a block diagram of the three stages of general XML query languages is depicted. The first stage is the scoping that decides the domain of the query, indicated as block 140. The second stage is the filtering or selection that chooses data to participate in the query, indicated by block 130. The third stage is the construction that builds the XML output from the chosen data, indicated as block 120. These three stages can be recursively defined, as indicated by the arrow 110, to form a nested loop iteration. The result of the three stages is a well-formed XML document.

Figure 2:
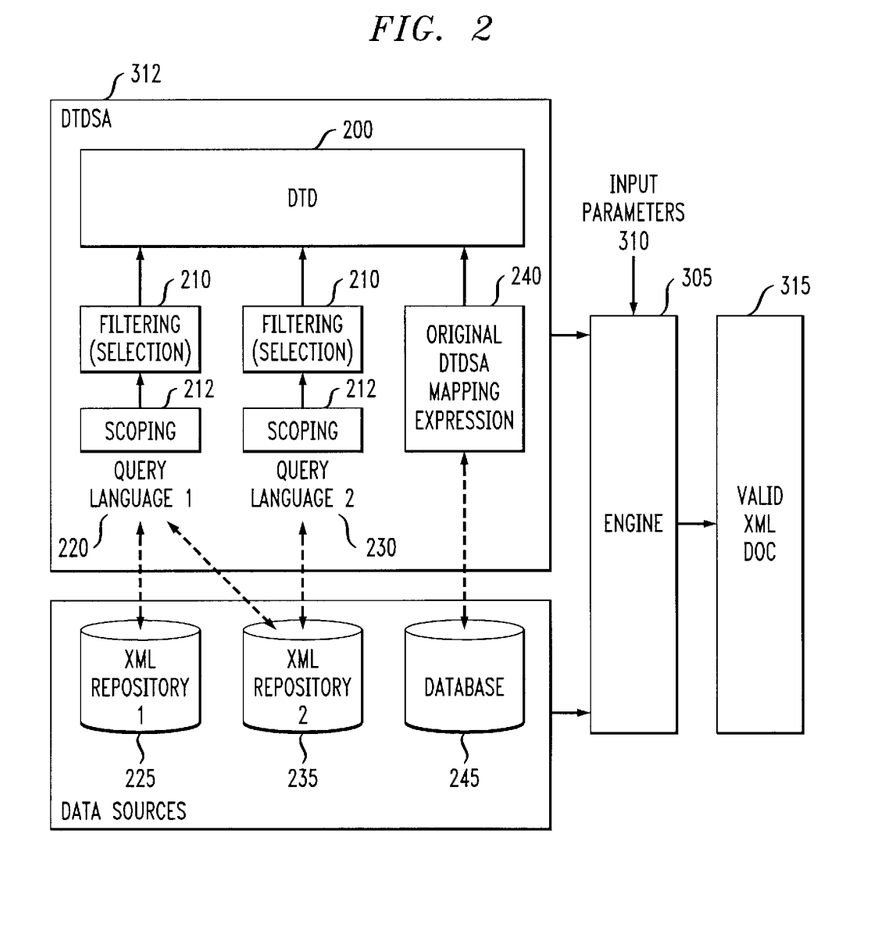
FIG. 2 is a block diagram illustrating a universal output constructor methodology for XML queries according to an embodiment of the present invention.

FIG. 2 is a block diagram illustrating a universal output constructor methodology for XML queries according to an embodiment of the present invention. As shown, a DTD 200 can be annotated with different expressions from different query languages, to form a mapping construct DTDSA 312 that guides the access and translation engine 305 to retrieve data from different types of data sources. The user may provide input parameters 310 to the engine, and receive as output a valid XML document 315. The mapping constructs can be written in the original DTDSA mapping expressions 240, the query languages that include the scoping (block 212) and filtering (block 210) stages such as XQL 230, the query languages that include an extra construction stage such as XML-QL 220, and a mixture of all of the above expressions or languages. If the query language includes a construction stage, the third stage shown as the construction stage 120 in FIG. 1 will be ignored. The query languages 220 and 230 may describe the mapping constructs for accessing XML repositories 225 and 235, while the original DTDSA mapping expression 240 may describe those for the relational database systems 245. The original DTDSA mapping expressions include value specifications and binding specifications, for example, as are illustrated and described below in the context of FIGS. 6A through 6E.

It is to be appreciated that the universal output constructor is preferably comprised of the engine 305 and the mapping framework DTDSA 312. However, in an alternative embodiment, the universal output constructor may be considered as just comprising the engine 305 which has access to the DTDSA 312.

Figure 3A:
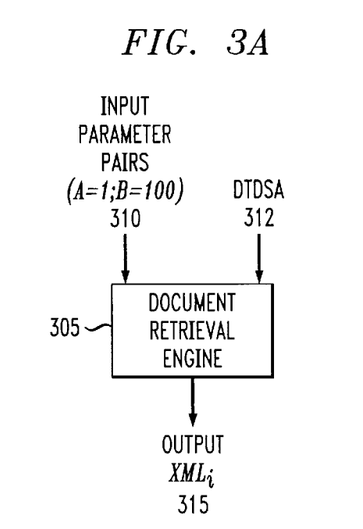
FIGS. 3A and 3B are flow diagrams illustrating an algorithm for generating XML using DTDSA with queries.
Figure 3B:
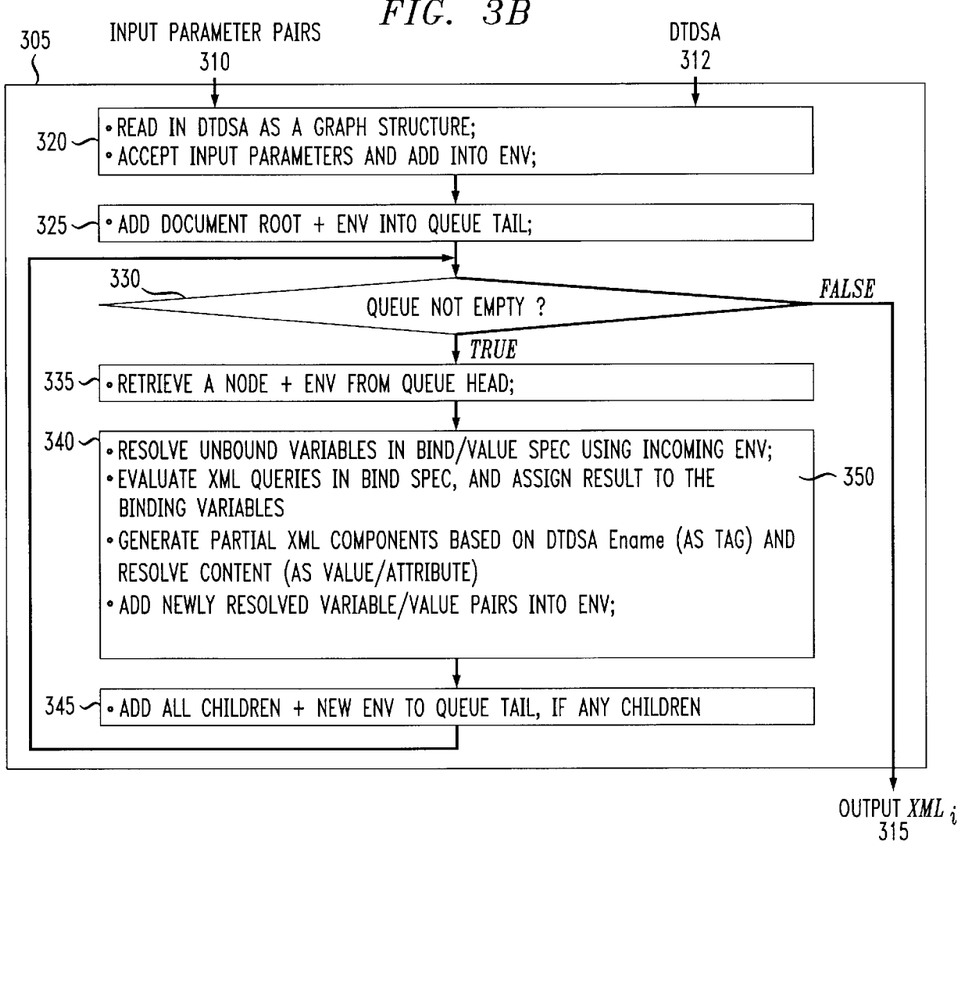
Figure 5:
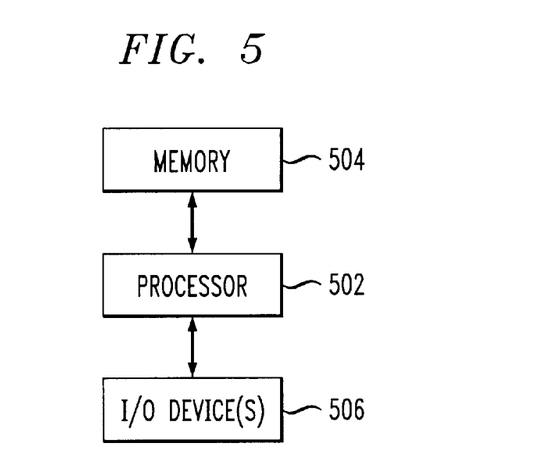
FIG. 5 is a block diagram illustrating a hardware implementation suitable for employing a universal output constructor for XML queries according to an embodiment of the present invention.

FIGS. 3A and 3B depict a method for generating XML documents based on the new mappings that are included in the DTDSA. The method makes use of the DTDSA method described above with a modification for evaluating XML queries in a binding specification, and assigning a result to the binding variables, as shown in block 350. It should be understood that the elements shown in FIG. 3B may be implemented in various forms of hardware, software or combinations thereof. Preferably, these elements are implemented in software on one or more appropriately programmed general purpose digital computers having a processor and memory and input/output interfaces, an example of which is shown in FIG. 5.

In any case, FIG. 3A illustrates a block diagram representing the XML composition algorithm using DTDSA. A document retrieval and composition engine or algorithm 305 receives input parameter name and value pairs 310, e.g., (A=1, B=100), and generates a return XML document 315 based on the provided DTDSA 312. An internal flow diagram of the algorithm 305 is shown in FIG. 3B.

Initially, the algorithm parses the DTDSA 312 into some internal format, e.g., a directed acyclic graph, which is easy to manipulate, and prepares the input parameters into environmental variables, as depicted in block 320 (i.e., read in DTDSA as a graph structure; accept input parameters and add into ENV). The algorithm then performs a breadth first search (BFS) traversal on the internal DTDSA structure, using a first-in-first-out queue to keep track of the set of structure nodes visited. The BFS traversal includes a standard procedure which sets up initial values (add document root and initial environmental variables ENV into queue tail) for the queue (block 325), repeats fetching the queue until the queue is empty (block 330), and for every node and environmental variables fetched (block 335—retrieve a node and ENV from queue head), performs operations (block 340 as will be described below) to generate partial XML components and adds all the children nodes, if any, and new environmental variables/values to the queue (block 345). As shown in block 340, the operations for a visited node, denoting a data type or attribute type, include: (1) resolving unbound variables which are associated with the data type or attribute, and defined in binding or value specifications in the DTDSA, using the fetched environmental variables/values (the resolution of unbound variables may involve accessing data sources and a predefined function calculation); (2) evaluating XML queries of different query languages in the binding specification, and assigning a result to the binding variables (step 350); (3) generating partial XML components based on current DTDSA node name (ENAME) as the tag, and the resolved content as the value or attribute; (4) adding the newly created variable/value pairs into the environmental variables (ENV).

Figure 4:
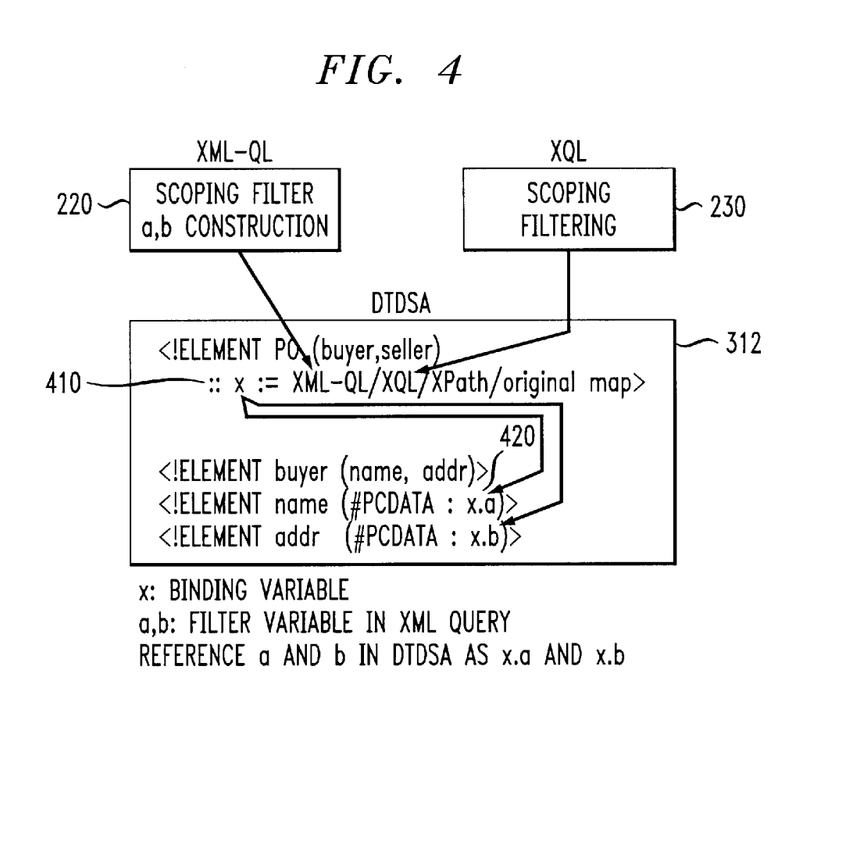
FIG. 4 is a diagram illustrating an association and distribution of variables in a DTDSA.

Referring now to FIG. 4, the association and distribution of variables in a DTDSA is illustrated. As shown, the DTDSA in a particular illustration may be represented as:

<!ELEMENT PO (buyer, seller) :: x:=XML-QL/XQL/XPath/original map>

<!ELEMENT buyer (name, addr)>

<!ELEMENT name (#PCDATA: x.a)>

<!ELEMENT addr (#PCDATA: x.b)> where 'x' is the binding variable, 'a' and 'b' are the filter variables in the XML query and 'a' and 'b' are referenced in DTDSA as 'x.a' and 'x.b,' respectively. The association relates to the binding specification in that the query results are bound to a variable, say 'x' as referenced by numeral 410. The distribution relates to the usages of the bound variables in the DTDSA. For example, 'x.a' at reference numeral 420 retrieves the value of column 'a' in a row bound by 'x' for a relational database, or the content of tag 'a' in an XML component bound by 'x' for an XML repository.

FIG. 5 is a block diagram illustrating a hardware implementation suitable for employing a universal output constructor for XML queries according to an embodiment of the present invention. It is to be understood that the universal output constructor for XML queries, namely, the engine 305 and, preferably, the DTDSA 312 (FIGS. 2 and 3), may be implemented on one such computer system, or on more than one separate such computer system, e.g., in a client-server relationship. For example, the engine 305 can be run as a server site application written in Java Servlet, or a client site application executed by an Internet browser.

As shown, the computer system may be implemented in accordance with a processor 502, a memory 504 and I/O devices 506. It is to be appreciated that the term "processor" as used herein is intended to include any processing device, such as, for example, one that includes a CPU (central processing unit) and/or other processing circuitry. The term "memory" as used herein is intended to include memory associated with a processor or CPU, such as, for example, RAM, ROM, a fixed memory device (e.g., hard drive), a removable memory device (e.g., diskette), flash memory, etc. In addition, the term "input/output devices" or "I/O devices" as used herein is intended to include, for example, one or more input devices, e.g., keyboard, for entering data to the processing unit, and/or one or more output devices, e.g., CRT display and/or printer, for presenting results associated with the processing unit. It is also to be understood that the term "processor" may refer to more than one processing device and that various elements associated with a processing device may be shared by other processing devices. Accordingly, software components including instructions or code for performing the methodologies of the invention, as described herein, may be stored in one or more of the associated memory devices (e.g., ROM, fixed or removable memory) and, when ready to be utilized, loaded in part or in whole (e.g., into RAM) and executed by a CPU.

DTDSA Mapping

As mentioned above, a preferred implementation for the mapping between DTD and a relational schema is a DTD source annotation (DTDSA), as described in the above-referenced U.S. Ser. No. 09/466,627. The following is a detailed description of such a DTDSA mechanism.

Figure 6A:
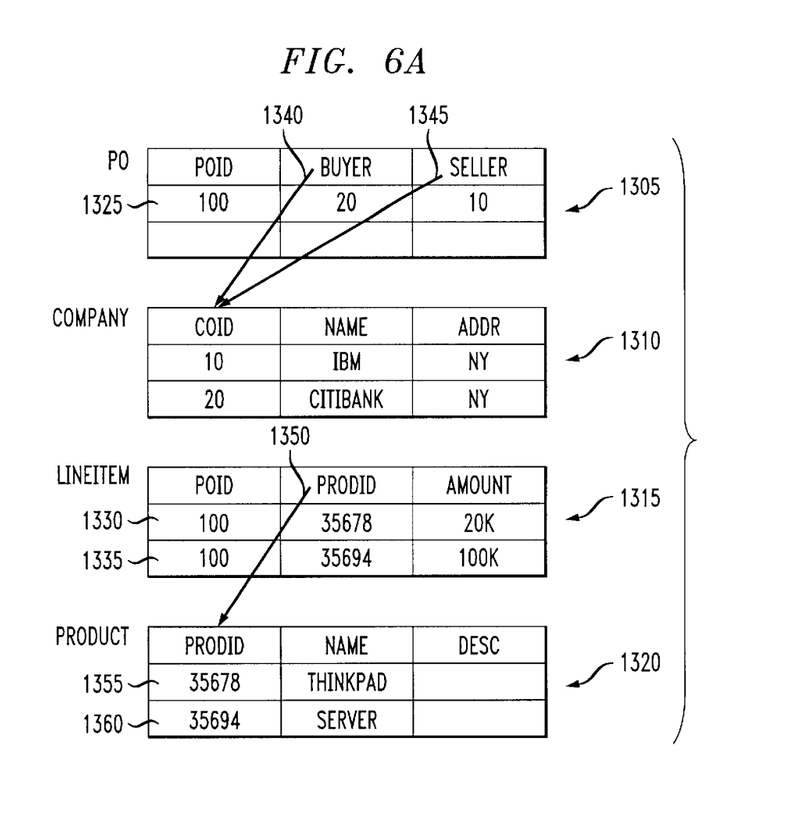
FIG. 6A is a diagram illustrating an example of a relational schema.

FIG. 6A illustratively includes four relational tables, also known as a relational schema, purchase order ("PO") 1305, company 1310, lineitem 1315, and product 1320.

Table 1305 has three columns, purchase order identification ("POID"), buyer, and seller. The rows of the table have numerical index values pointing to values for the columns. Thus purchase order number 100 is associated with buyer 20 and seller 10.

Table 1310 has three columns: company identification ("COID"), name, and address ("ADDR"). The rows associate numerical values with actual company names and addresses. Thus the numerical value 10 is associated with the company IBM, having an address in New York, and the numerical value 20 is associated with the company Citibank, also having an address in New York.

Table 1315 has three columns: POID, product identification ("PRODID"), and amount. The rows, 1330 and 1335, associate purchase order identification numbers with product identification numbers and quantities. In the figure, purchase order 100 is associated with two product identifications, 35678 and 35694, of which 20 k and 100 k are ordered respectively.

Table 1320 has three columns, PRODID, name, and desc. (description). The rows associate product identification 35678 with a "THINKPAD™" and product identification 35694 with a server.

Arrows in FIG. 6A illustrate foreign key relations among various fields. For example, the record 1325 in PO table with POID=100 is related via arrows 1340 and 1345 to two records 1330, 1335 in the lineitem table 1315 with POID=100. Similarly, records 1330 and 1335 are associated via arrow 1350 to records 1355 and 1360.

Figure 6B:
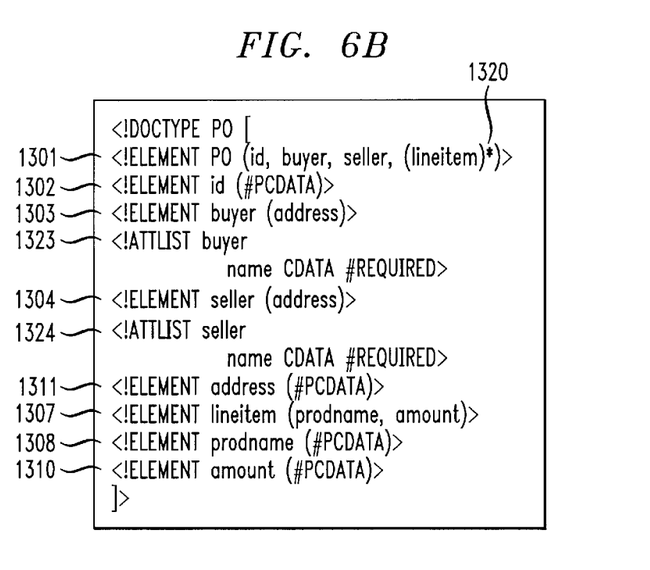
FIG. 6B is a diagram illustrating an example of a DTD.

FIG. 6B shows an example of a Document Type Definition (DTD). As explained above, XML makes use of DTDs to specify documents. DTDs are very flexible and can specify any number of different documents. FIG. 6B shows only one simple example, in which a purchase order is specified.

Line 1301 shows the definition of the variable PO. In a tree-like fashion, the definition incorporates child definitions, i.e., "id" defined at line 1302, "buyer" defined at line 1303, "seller" defined at line 1304, and "lineitem" defined at line 1307. The asterisk after "lineitem" at 1320 indicates that this feature may be repeated any number of times in the purchase order. The definitions of "id" 1302, "address" 1311, "prodname" 1308, and "amount" 1309 use the #PCDATA command to get data directly from a data storage device. The definitions of "buyer" and "seller" have attribute lists at 1323 and 1324. The definition of lineitem, also incorporates child definitions, "prodname" at line 1308 and "amount" at line 1310.

Figure 6C:
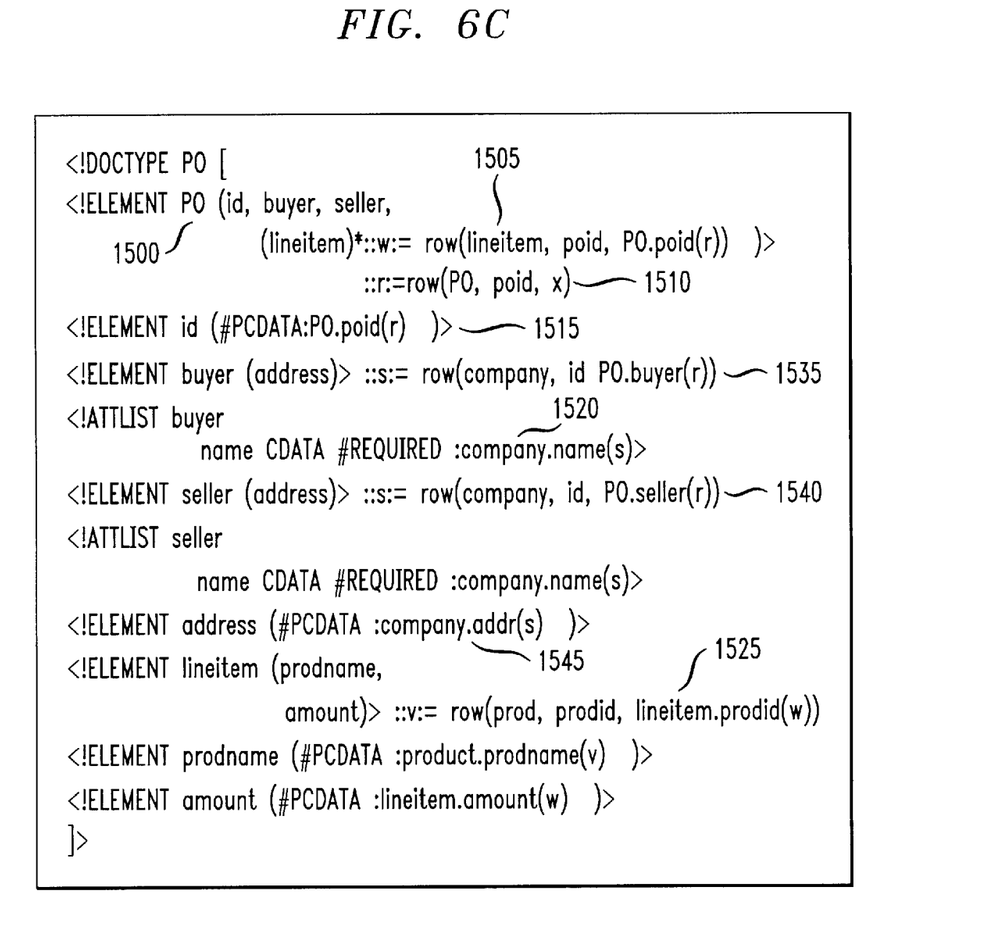
FIG. 6C is a diagram illustrating a DTD annotated in accordance with a preferred mapping language.

FIG. 6B is to be annotated based on the relational schema in FIG. 6A, and the resulting annotated DTD (DTDSA) is illustrated in FIG. 6C. FIG. 6C shows a DTD annotated in accordance with the preferred mapping language, i.e., a DTDSA. The preferred mapping language includes two types of constructs: the binding specification and the value specification.

Figure 6D:
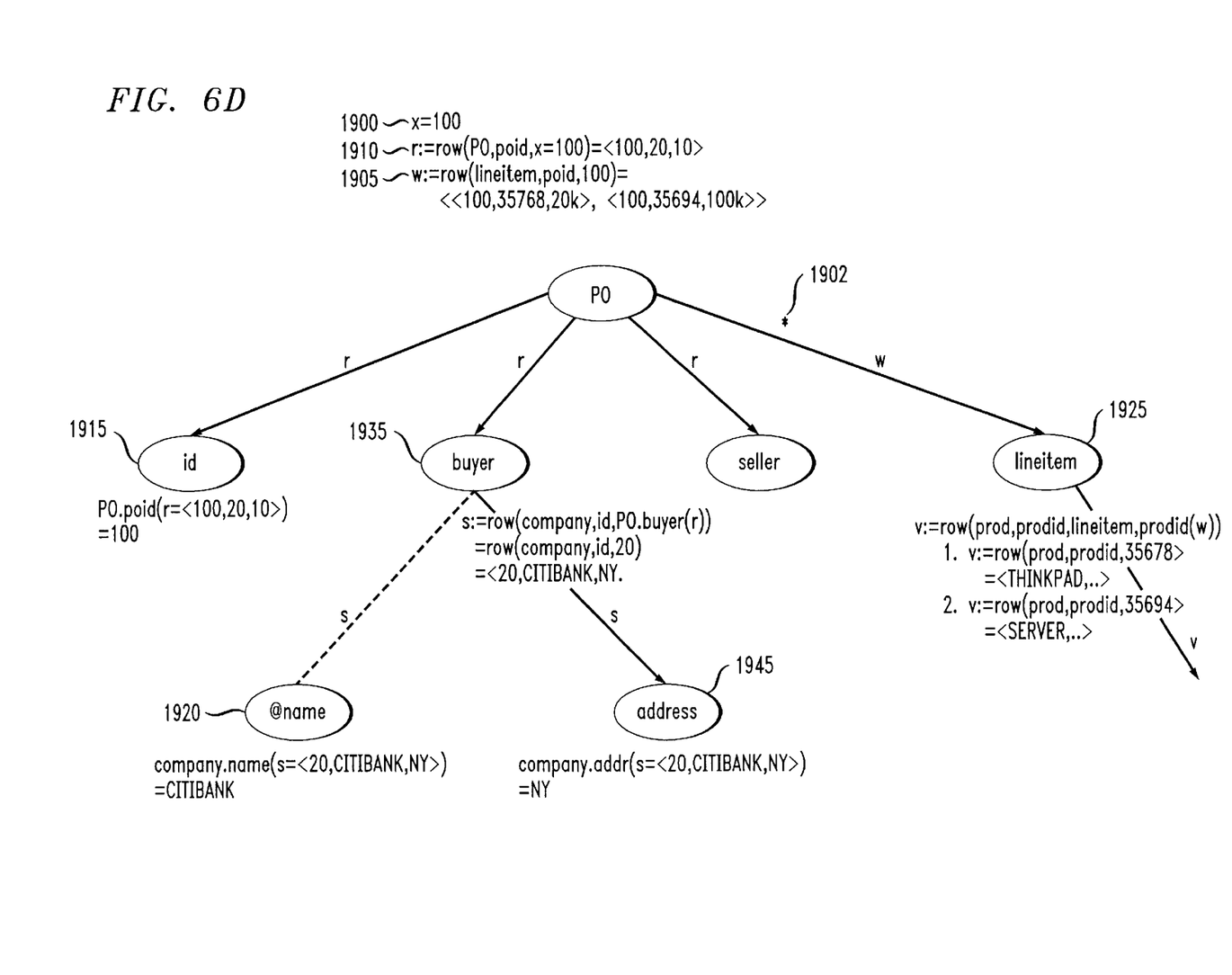
FIG. 6D is a diagram illustrating a directed acyclic graph specifically related to the example of FIGS. 6A, 6B and 6C.

FIG. 6D shows a directed acyclic graph specifically related to the example of FIGS. 6A, 6B and 6C. A sequence of resolutions occurs based on the BFS traversal order. The resolutions at numerals 1905, 1910, 1915, 1920, 1925, 1935, and 1945 of FIG. 6D correspond to the binding/value specifications at numerals 1505, 1510, 1515, 1520, 1525, 1535, and 1545 of FIG. 6C, respectively. The resolution for the binding specification at numeral 1510 using x=100 involves table PO access with poid=100 and derives into a record <100,20,10> for r as shown in 1910. The binding specification in 1505 uses the record r to derive its third argument, PO.poid(r), to 100, which is needed to resolution of w, i.e., row(lineitem,poid,100). Since there are two records in table lineitem with POID=100, as shown by numerals 1330 and 1335 in FIG. 6A, w is assigned the two records as shown at numeral 1905. Such binding can be used to derive multiple occurrence of a data type along the edge marked with "*" or "+" as shown at numeral 1902. The two records for variable w can be used to derive two XML components lineitem as shown at numeral 1925. Attribute values with value specification can also be similarly derived. For example, as shown at numeral 1920, the attribute name with a "@" prefix of data type buyer can have a resolved value s from deriving the binding specification at numeral 1535 using r as shown at numeral 1935.

Figure 6E:
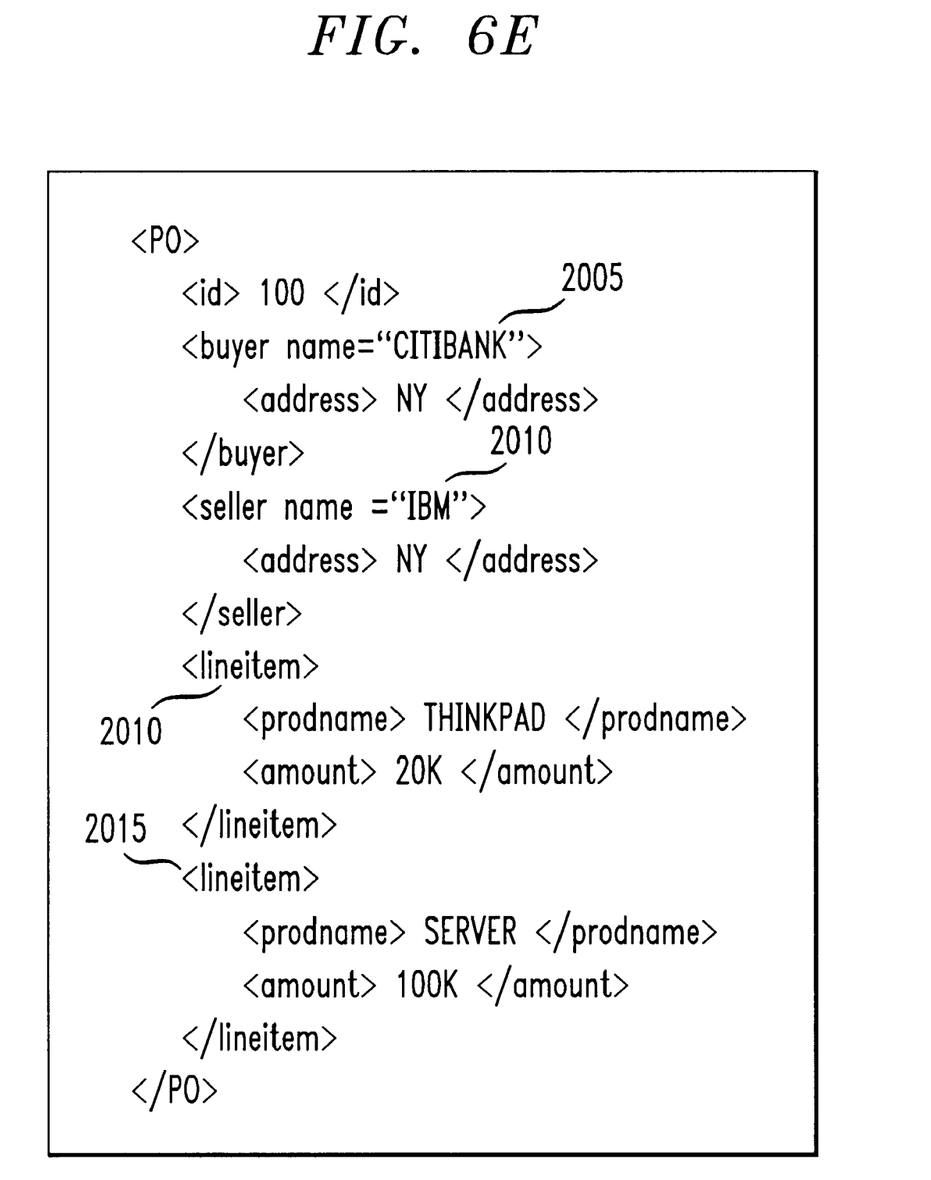
FIG. 6E is a diagram illustrating a retrieved XML document for the example depicted in FIGS. 6A, 6B, 6C and 6D.

FIG. 6E shows the retrieved XML document for the example depicted in FIGS. 6A, 6B, 6C and 6D. Based on the input x=100, the document is a PO with id 100. There are two line items retrieved and composed as shown at numerals 2010 and 2015. Attributes are also illustrated as shown at numerals 2005 and 2010.

Although illustrative embodiments of the present invention have been described herein with reference to the accompanying drawings, it is to be understood that the invention is not limited to those precise embodiments, and that various other changes and modifications may be affected therein by one skilled in the art without departing from the scope or spirit of the invention.

What is claimed is:

1. A method of processing one or more extensible Markup Language (XML) queries, the method comprising the steps of:

generating a mapping construct which maps a predetermined document type definition (DTD) to one or more data sources to be accessed in response to the one or more XML queries, the mapping construct including a binding specification wherein the one or more XML queries are bound to one or more binding variables;

evaluating the one or more XML queries in accordance with the binding specification of the mapping construct and assigning the evaluation result to the one or more binding variables; and generating an XML document resulting from the query evaluation, wherein the resulting XML document conforms to the predetermined DTD.

2. The method of claim 1, wherein the one or more XML queries are written in one or more XML query languages.

3. The method of claim 1, wherein the resulting XML document is a combination of more than one XML query associated with one or more query languages.

4. The method of claim 1, wherein the resulting XML document is a combination of one or more XML queries and one or more non-XML queries.

5. The method of claim 1, wherein the DTD is specified by a user.

6. The method of claim 1, wherein the mapping construct generation step comprises the steps of:

determining suitable DTD constructs;

binding the constructs to variables;

associating the variables with a partial XML result obtained from scoping and filtering stages of the XML query; and distributing the variables to suitable DTD constructs with value functions.

7. The method of claim 6, further comprising the step of accepting scalar-based results from the scoping and filtering stages.

8. The method of claim 6, further comprising the step of accepting subtree-based results from the scoping and filtering stages.

9. The method of claim 6, further comprising the step of allowing the bindings to be used as parameters in at least one of value generation functions and other binding functions.

10. The method of claim 6, further comprising the step of resolving a nested or recursive filtering query construct with sequential cascade binding constructs.

11. The method of claim 1, wherein the query evaluation step comprises the step of combining different parsing and evaluating mechanisms for evaluating XML queries from different XML query languages.

12. The method of claim 11, further comprising the step of allowing binding variables to be used in one or more XML queries of different query languages.

13. The method in claim 11, further comprising the step of evaluating one or more XML queries of different query languages with binding variables as parameters.

14. The method of claim 1, wherein the resulting XML document generation step comprises the steps of:

recursively traversing DTD constructs from a root element; and associating with binding variables after one of resolving binding functions and evaluating XML queries, until reaching a leaf construct, where a partial XML result is obtained by evaluating associated value functions.

15. The method of claim 14, wherein the resulting XML document is composed during a traversal returning stage by adding XML tags enclosing the partial XML result.

16. Apparatus for processing one or more extensible Markup Language (XML) queries, the apparatus comprising the steps of:

at least one processor operative to: (i) generate a mapping construct which maps a predetermined document type definition (DTD) to one or more data sources to be accessed in response to the one or more XML queries, the mapping construct including a binding specification wherein the one or more XML queries are bound to one or more binding variables; (ii) evaluate the one or more XML queries in accordance with the binding specification of the mapping construct and assigning the evaluation result to the one or more binding variables; and (iii) generate an XML document resulting from the query evaluation, wherein the resulting XML document conforms to the predetermined DTD.

17. The apparatus of claim 16, wherein the one or more XML queries are written in one or more XML query languages.

18. The apparatus of claim 16, wherein the resulting XML document is a combination of more than one XML query associated with one or more query languages.

19. The apparatus of claim 16, wherein the resulting XML document is a combination of one or more XML queries and one or more non-XML queries.

20. The apparatus of claim 16, wherein the DTD is specified by a user.

21. The apparatus of claim 16, wherein the mapping construct generation operation comprises: (i) determining suitable DTD constructs; (ii) binding the constructs to variables; (iii) associating the variables with a partial XML result obtained from scoping and filtering stages of the XML query; and (iv) distributing the variables to suitable DTD constructs with value functions.

22. The apparatus of claim 21, wherein the at least one processor is further operative to accept scalar-based results from the scoping and filtering stages.

23. The apparatus of claim 21, wherein the at least one processor is further operative to accept subtree-based results from the scoping and filtering stages.

24. The apparatus of claim 21, wherein the at least one processor is further operative to allow the bindings to be used as parameters in at least one of value generation functions and other binding functions.

25. The apparatus of claim 21, wherein the at least one processor is further operative to resolve a nested or recursive filtering query construct with sequential cascade binding constructs.

26. The apparatus of claim 16, wherein the query evaluation operation comprises combining different parsing and evaluating mechanisms for evaluating XML queries from different XML query languages.

27. The apparatus of claim 26, wherein the at least one processor is further operative to allow binding variables to be used in one or more XML queries of different query languages.

28. The apparatus in claim 26, wherein the at least one processor is further operative to evaluate one or more XML queries of different query languages with binding variables as parameters.

29. The apparatus of claim 16, wherein the resulting XML document generation operation comprises: (i) recursively traversing DTD constructs from a root element; and (ii) associating with binding variables after one of resolving binding functions and evaluating XML queries, until reaching a leaf construct, where a partial XML result is obtained by evaluating associated value functions.

30. The apparatus of claim 29, wherein the resulting XML document is composed during a traversal returning stage by adding XML tags enclosing the partial XML result.

31. An article of manufacture for processing one or more eXtensible Markup Language (XML) queries, comprising a machine readable medium containing one or more programs which when executed implement the steps of:

generating a mapping construct which maps a predetermined document type definition (DTD) to one or more data sources to be accessed in response to the one or more XML queries, the mapping construct including a binding specification wherein the one or more XML queries are bound to one or more binding variables;

evaluating the one or more XML queries in accordance with the binding specification of the mapping construct and assigning the evaluation result to the one or more binding variables; and generating an XML document resulting from the query evaluation, wherein the resulting XML document conforms to the predetermined DTD.

32. Computer-based apparatus for processing one or more eXtensible Markup Language (XML) queries, the apparatus comprising:

a document retrieval engine responsive to the one or more XML queries and to a predetermined mapping construct which maps a predetermined document type definition (DTD) to one or more data sources to be accessed in response to the one or more XML queries, wherein the document retrieval engine is operative to (i) evaluate the one or more XML queries in accordance with the mapping construct; and (ii) generate an XML document resulting from the query evaluation, wherein the resulting XML document conforms to the predetermined DTD.

33. A method of processing one or more extensible Markup Language (XML) queries, the method comprising the steps of:

generating a mapping construct which maps a predetermined document type definition (DTD) to one or more data sources to be accessed in response to the one or more XML queries;

evaluating the one or more XML queries in accordance with the mapping construct; and generating an XML document resulting from the query evaluation.

* * * * *

UNITED STATES PATENT AND TRADEMARK OFFICE
CERTIFICATE OF CORRECTION

PATENT NO. : 6,766,330 B1
DATED : July 20, 2004
INVENTOR(S) : S-K. Chen et al.

It is certified that error appears in the above-identified patent and that said Letters Patent is hereby corrected as shown below:

Title page,
Item [54], Title, replace "UNIVERSAL OUTPUT CONSTRUCTOR FOR XML QUERIES UNIVERSAL OUTPUT CONSTRUCTOR FOR XML QUERIES" with -- UNIVERSAL OUTPUT CONSTRUCTOR FOR XML QUERIES --.

Column 1,
Line 26, replace "eXtensible" with -- Extensible --

Column 11,
Line 57, replace "extensible" with -- Extensible --

Column 12,
Line 59, replace "extensible" with -- Extensible --

Column 14,
Lines 10 and 28, replace "eXtensible" with -- Extensible --
Line 41, replace "extensible" with -- Extensible --

Signed and Sealed this

Thirty-first Day of August, 2004

JON W. DUDAS
*Director of the United States Patent and Trademark Office*